US011776265B2

(12) United States Patent
Clark et al.

(10) Patent No.: US 11,776,265 B2
(45) Date of Patent: Oct. 3, 2023

(54) HIGHLIGHT VIDEO CREATION

(71) Applicant: CSR Lab, LLC, Dover, DE (US)

(72) Inventors: Christopher M. Clark, Charlotte, NC (US); Stephen E. Johnson, Brick, NJ (US); Robert J. Corsi, Eatontown, NJ (US)

(73) Assignee: CSR Lab, LLC, Dover, DE (US)

( * ) Notice: Subject to any disclaimer, the term of this patent is extended or adjusted under 35 U.S.C. 154(b) by 260 days.

(21) Appl. No.: 17/248,405

(22) Filed: Jan. 22, 2021

(65) Prior Publication Data

US 2021/0232826 A1    Jul. 29, 2021

Related U.S. Application Data

(60) Provisional application No. 62/964,892, filed on Jan. 23, 2020.

(51) Int. Cl.
*G06K 9/00* (2022.01)
*G06V 20/40* (2022.01)

(52) U.S. Cl.
CPC .............. *G06V 20/42* (2022.01); *G06V 20/49* (2022.01); *G06V 20/44* (2022.01)

(58) Field of Classification Search
CPC ........ G06V 20/40; G06V 20/41; G06V 20/42; G06V 20/43; G06V 20/44; G06V 20/46; G06V 20/47; G06V 20/48; G06V 20/49
See application file for complete search history.

(56) References Cited

U.S. PATENT DOCUMENTS

| | | | |
|---|---|---|---|
| 2009/0131177 A1* | 5/2009 | Pearce | A63F 13/30 463/43 |
| 2013/0227416 A1* | 8/2013 | Massena | G06F 3/0488 715/723 |
| 2016/0155475 A1* | 6/2016 | Hamer | H04N 21/8456 386/224 |
| 2018/0098134 A1* | 4/2018 | Sufuentes | H04N 21/8549 |
| 2019/0099653 A1* | 4/2019 | Wanke | G06Q 50/01 |

* cited by examiner

*Primary Examiner* — Bobbak Safaipour
*Assistant Examiner* — Duy Tran
(74) *Attorney, Agent, or Firm* — TechnicalAttorney; Rick Barnes

(57) ABSTRACT

A computerized apparatus for creating a highlight video, including an interface for charting an event by recording information in regard to the event, where the event information is associated with time codes. A camera captures video of the event, where the video is associated with the time codes. The interface also creates triggers including lists of at least one action. An input/output uploads the event information, video, and triggers to a server. A processor produces entries in an action log from the event information, compares the entries in the action log to the triggers to determine if any of the entries in the action log match any of the triggers, collects the time codes of those entries that match the triggers, creates video clips from the video of the event, based on the collected time codes, and compiles the video clips into the highlight video.

20 Claims, 11 Drawing Sheets

| TRIGGER 1 | RUNS SCORED > 0 | |
|---|---|---|
| TRIGGER 2 | OUTS == 2 | RUNNER ON SECOND AND THIRD | AT BAT RESULT == STRIKE OUT |

FIG. 9

| VIDEO FILE START TIME 2020-01-05 21:53:02 | | |
|---|---|---|
| VIDEO CLIP 1 113 | VIDEO CLIP 2 114 | MASTER VIDEO FILE 112 |

FIG. 11

| PITCH ID | DATE | TIME STAMP | BALLS | STRIKES | OUTS | PITCH LOCATION | PITCH TYPE | PITCH RESULT | AT BAT RESULT | RUNNERS | RUNS SCORED |
|---|---|---|---|---|---|---|---|---|---|---|---|
| 100 | 2020-01-05 | 21:55:42+00:00 | 0 | 0 | 0 | LOW AWAY | FASTBALL | STRIKE LOOKING | — | — | 0 |
| 101 | 2020-01-05 | 21:55:56+00:00 | 0 | 1 | 0 | MIDDLE IN | FASTBALL | FOUL | — | — | 0 |
| 102 | 2020-01-05 | 21:56:09+00:00 | 0 | 2 | 0 | DOWN | CURVEBALL | BALL | — | — | 0 |
| 103 | 2020-01-05 | 21:56:22+00:00 | 1 | 2 | 0 | MIDDLE | FASTBALL | IN PLAY | DOUBLE | — | 0 |
| 104 | 2020-01-05 | 21:58:06+00:00 | 0 | 0 | 0 | LOW AWAY | FASTBALL | STRIKE LOOKING | — | ON SECOND | 0 |
| 105 | 2020-01-05 | 21:58:22+00:00 | 0 | 1 | 0 | MIDDLE | FASTBALL | IN PLAY | TRIPPLE | ON SECOND | 1 |
| 106 | 2020-01-05 | 22:03:09+00:00 | 0 | 0 | 0 | LOW INSIDE | FASTBALL | IN PLAY | POP UP OUT | ON THIRD | 0 |
| 107 | 2020-01-05 | 22:05:10+00:00 | 0 | 0 | 1 | LOW AWAY | CHANGE UP | IN PLAY | ERROR 3RD BASE | ON THIRD | 0 |
| 108 | 2020-01-05 | 22:07:30+00:00 | 0 | 0 | 1 | MIDDLE | FASTBALL | STRIKE SWINGING | — | ON FIRST AND THIRD | 0 |
| 109 | 2020-01-05 | 22:07:51+00:00 | 0 | 1 | 1 | INSIDE | FASTBALL | STRIKE LOOKING | — | ON FIRST AND THIRD | 0 |
| 110 | 2020-01-05 | 22:08:02+00:00 | 0 | 2 | 1 | LOW AWAY | CHANGE UP | IN PLAY | GROUND OUT | ON FIRST AND THIRD | 0 |
| 111 | 2020-01-05 | 22:09:03+00:00 | 0 | 0 | 2 | AWAY | FASTBALL | STRIKE LOOKING | — | ON SECOND AND THIRD | 0 |
| 112 | 2020-01-05 | 22:09:14+00:00 | 0 | 1 | 2 | OUTSIDE | FASTBALL | BALL | — | ON SECOND AND THIRD | 0 |
| 123 | 2020-01-05 | 22:09:29+00:00 | 1 | 1 | 2 | LOW | CHANGE UP | STRIKE SWINGING | — | ON SECOND AND THIRD | 0 |
| 124 | 2020-01-05 | 22:09:41+00:00 | 1 | 2 | 2 | UP AND IN | FASTBALL | STRIKE SWINGING | STRIKE OUT | ON SECOND AND THIRD | 0 |

HIGHLIGHT VIDEO CREATION

This application claims rights and priority on prior U.S. provisional patent application Ser. No. 62/964,892 filed 2020 Jan. 23, the entirety of the disclosure of which is included herein by reference. This invention relates to the field of video production. More particularly, this invention relates to the automated generation of event highlight videos.

FIELD

Introduction

Professional sporting events have had highlight videos for years. These highlight videos are typically produced by the broadcaster who originally recorded and aired the sporting event, and are typically produced by professional editors, graphic artists, and sportscasters, working on professional grade equipment. Thus, each such highlight video is the product of hours of work on equipment that costs many thousands of dollars.

Non-professional events, on the other hand, such as amateur sporting events, have only recently had access to live, online charting, such as scoring. This is typically created by parents and spectators who record or live stream the event. Thus, various videos of parts or all of the event from a variety of different positions and in a variety of different video formats can now be created and made available online, but there is no easy way to inspect and edit all of these video sources into a highlight video.

In other words, a team of professionals using professional equipment could produce very nice highlight videos of such events from these amateur resources, but there are no funds to hire the professionals and acquire the equipment that is traditionally required for such an effort.

So, even though there are systems available to chart sporting events such as youth, high school, and college baseball events and softball events and provide live scoring online, and even though there are video cameras and smart phones available at such events for recording the event, there has been no reasonable way to use these resources to produce a highlight video.

What is needed, therefore, is a system that tends to reduce issues such as those described above, at least in part, and produce highlight videos of these events.

SUMMARY

The above and other needs are met by a computerized apparatus for creating a highlight video, including an interface for charting an event by recording information in regard to the event, where the event information is associated with time codes. A camera captures video of the event, where the video is associated with the time codes. The interface also creates triggers including lists of at least one action. An input/output uploads the event information, video, and triggers to a server. A processor produces entries in an action log from the event information, compares the entries in the action log to the triggers to determine if any of the entries in the action log match any of the triggers, collects the time codes of those entries that match the triggers, creates video clips from the video of the event, based on the collected time codes, and compiles the video clips into the highlight video.

In some embodiments according to this aspect of the invention, the processor creates and posts a play-by-play page that provides a selection of the event information on a web page. In some embodiments, the play-by-play page includes a given one of the video clips as soon as it is created. In some embodiments, the play-by-play page includes the highlight video. In some embodiments, the highlight video includes an introduction to the event at a beginning of the highlight video. In some embodiments, the highlight video includes transitions between each of the video clips compiled into the highlight video.

According to another aspect of the invention, there is described a method for creating a highlight video, including charting an event by recording information in regard to the event, where the event information is associated with time codes. Video of the event is captured, where the video is associated with the time codes. Triggers are created, comprising lists of at least one action. The event information, video, and triggers are uploaded to a server. Entries in an action log are produced from the event information, and the entries in the action log are compared to the triggers to determine if any of the entries in the action log match any of the triggers. The time codes of those entries that match the triggers are collected, and video clips from the video of the event are created, based on the collected time codes. The video clips are compiled into the highlight video.

In some embodiments according to this aspect of the invention, the steps further comprise creating and posting a play-by-play page that provides a selection of the event information on a web page. In some embodiments, the play-by-play page includes a given one of the video clips as soon as it is created. In some embodiments, the play-by-play page includes the highlight video. In some embodiments, the highlight video includes an introduction to the event at a beginning of the highlight video. In some embodiments, the highlight video includes transitions between each of the video clips compiled into the highlight video. In some embodiments, the step of charting the event is performed by watching the video of the event.

According to yet another aspect of the invention, there is described a non-transitory, computer-readable storage medium having stored thereon a computer program comprising a set of instructions for causing a computer to create a highlight video, including charting an event by recording information in regard to the event, where the event information is associated with time codes. Video of the event is captured, where the video is associated with the time codes. Triggers are created, comprising lists of at least one action. The event information, video, and triggers are uploaded to a server. Entries in an action log are produced from the event information, and the entries in the action log are compared to the triggers to determine if any of the entries in the action log match any of the triggers. The time codes of those entries that match the triggers are collected, and video clips from the video of the event are created, based on the collected time codes. The video clips are compiled into the highlight video.

In some embodiments according to this aspect of the invention, the steps further comprise creating and posting a play-by-play page that provides a selection of the event information on a web page. In some embodiments, the play-by-play page includes a given one of the video clips as soon as it is created. In some embodiments, the play-by-play page includes the highlight video. In some embodiments, the highlight video includes an introduction to the event at a beginning of the highlight video. In some embodiments, the highlight video includes transitions between each of the video clips compiled into the highlight video. In some embodiments, the step of charting the event is performed by watching the video of the event.

DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 3 is a screen shot of pitch result screen for a program according to an embodiment of the present invention.

FIG. 4 is a screen shot of an at-bat result screen for a program according to an embodiment of the present invention.

FIG. 8 is a screen shot of a charted event for a program according to an embodiment of the present invention.

FIG. 9 is a depiction of rules for clipping a video according to an embodiment of the present invention.

FIG. 10 is a depiction of a table of charted information from an event according to an embodiment of the present invention.

FIG. 11 is a representation of video clips that are selected from a larger video file, based upon the generated events of FIG. 10 and the rules of FIG. 9 according to an embodiment of the present invention.

DESCRIPTION

Figure 1:
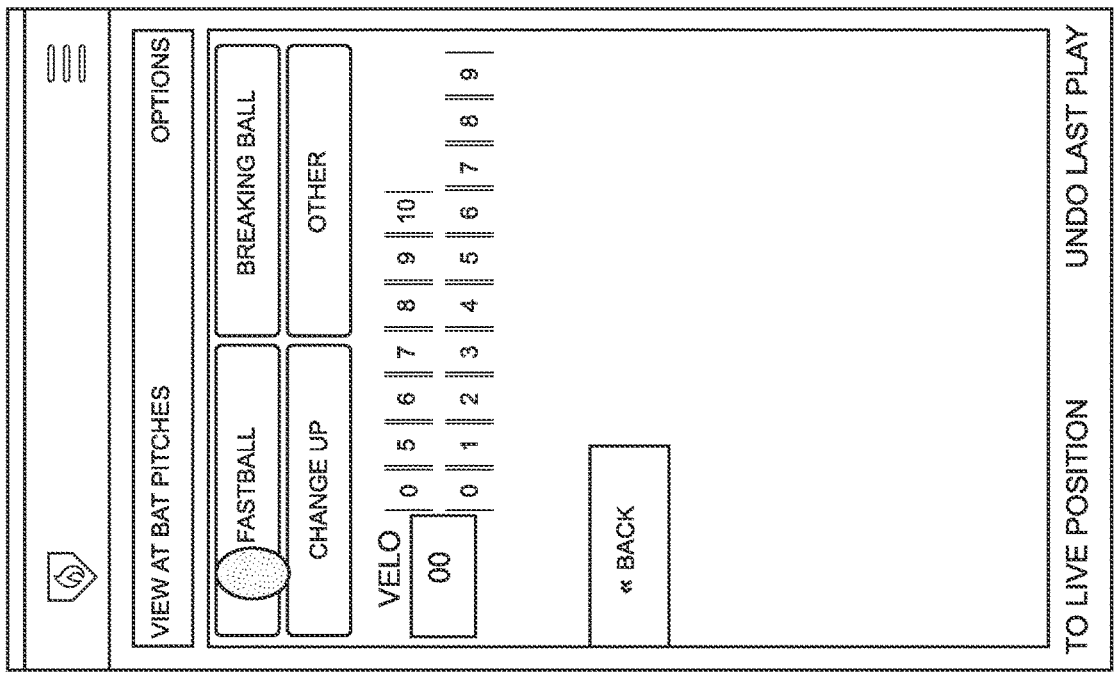
FIG. 1 is a screen shot of pitch placement screen for a program according to an embodiment of the present invention.

Various embodiments according to the present invention enable a user to chart the event using a software tool, upload video of the event using the software tool, and then the software tool can automatically create and make available a highlight video of the event.

In one embodiment, charting is accomplished according to the following process. A user is at an event and has at least one video camera recording the event. The user also has an internet-connected device (such as a laptop, smartphone, or tablet) that is connected to a server. The user uses the device to communicate with the server and chart the event, such as pitch-by-pitch for a ball game. The user enters the lineups for both teams and starts charting the event by recording the result of each pitch, such as pitch location, pitch type, and result. The server records this information along with the timestamp of when each pitch/play data set was entered. The user also records base running changes, such as runners getting out, runners stealing bases, or runners scoring. The user continues to chart the entire event in the software, which is automatically and continually captured by the server. Once the event is over, the user uploads all of the recorded video to the server.

The tool can also be used to video record the event, and to upload additional videos of the event to a video repository. The tool then uses the chart and cuts and clips the video together to produce a condensed video of just the user-defined moments of the event, without further manual intervention by the user. This highlight video can selectively include professional-looking elements such as text and logos that are overlaid onto the video, the interlacing of multiple angles from the various uploaded videos, and so forth.

The features of various embodiments according to the present invention are particularly described in regard to baseball sporting events, but it is appreciated that are event types are also contemplated herein, such as plays, speeches, concerts, and other types of sporting events.

Overview

Various embodiments of the present invention make use of a server, a portable computing device such as a smartphone or tablet, and a camera that can record video that can be uploaded to the server.

In one embodiment, a user has a smartphone that is connected over a cellular network to the server, which is running the event charting software. In one embodiment, the user is sitting in the stands at a baseball game. In one embodiment, the user sets up a video camera that records video, and audio as desired, of the baseball game.

The software on the server analyzes the timestamps in the various video files to determine the times that these video files were recorded. The server steps through each play (such as pitches) that was charted for the event, and checks whether that play matches any of the criteria for inclusion in the highlight video, as described in more detail below. If it matches, then the software cuts a clip out of one or more of the available video files, where the clip has a user-defined length, such as ten seconds. In one embodiment, the software then selectively reprocesses the video clip to overlay a software-generated scoreboard graphic on the video clip, as well as logos and text describing what happened on that play. Then the software moves on to the next play.

After cycling through all the plays, the software then assembles all of the video clips that were made as described above, and combines them into one highlight video, selectively including a title screen with the participants involved in the event (such as athletes or teams), the date and location of the event, and transitions between the assembled video clips. This highlight video is selectively made available on an event web page.

In some embodiments the user is able to set various defaults in a one-time process for the various selectable decisions described above, so that the process of creating the highlight video is automated and does not require any manual intervention once the charting information and videos have been uploaded to the server. In some embodiments, these various defaults can be overridden by the user, as desired.

When the software creates the highlight video it cycles through all of the recorded plays of the event (such as pitches in baseball game) that were charted in the software by the user. The software looks for plays that qualify for the highlight video based on a list of criteria. For example: any play in a baseball game in which a run was scored, or a batter struck out to end an inning with a runner on second base or third base. When a play matches the criteria, a video clip is cut from the uploaded video files.

The software includes the functionality to score an event, such as pitch-by-pitch, analyze the metadata of a video file to determine the start time and the stop time of the video, analyze the video for various play situations, and cut and splice the extracted video clips.

The criteria for determining the play/pitch situations that trigger the extraction of a video clip from an uploaded video file are, in one embodiment, dynamic, user configurable options. In some embodiments, the user presets what he considers to be a moment to include in the highlight video. For example, in one embodiment, a college coach wants to get a video on any left-handed pitcher that throws a baseball faster than ninety miles per hour, with a spin rate of between about 4,000 and 6,000 rotations per minute. The software can test each pitch/play event for many different triggers such as this.

In some embodiments, the system can be configured to create a highlight video featuring only a specific participant in a specific event, or for a specific participant across multiple events, or for a specific group, such as a team, across multiple events. For example, a baseball team films every game, and at the end of the season a highlight video is created automatically for every player. In another example, a customized video is created based on pitch/play situations for each player to send to college/pro scouts and coaches for recruiting purposes.

In some embodiments, the system is configured to work with live streaming, and create highlight clips within seconds, or some other user-defined length of time, after the trigger event happens. In this embodiment, the software is watching the pitch/play events in real time for events that match the criteria for a trigger. Then the video file coming from the live-stream camera is used by the software to create a clip. This clip is then placed on the event web page, emailed, or shared on social media, for example.

In some embodiments, the system is configured to handle multiple video files from cameras positioned at different angles, and pick and choose which camera angle to use for a specific clip. For example, if the pitch was a strike out, the software can be configured by the user to select video from the camera behind home plate. If the play was a big hit by a left-handed hitter, the software can be configured by the user to start the clip with the recorded video from the camera facing the batter along the third base line, then split-screen to also include the video from the cameras facing the batter from centerfield and behind home plate, to show the ball in play and the hitter running, possibly with a runner scoring. In some embodiments the software is selectively configurable to vary the length of a clip based on the type of event that is included within the given clip. In another embodiment, computer vision technology is employed to look for motion in the video recording to substantially stop, at which time the specific clip is ended.

OTHER EMBODIMENTS

Various embodiments of the system receive input from a variety of different data sources in regard to the event, including data sources that track information in regard to the participants involved in one or more events. For example, for a baseball game the event can be broken down into a series of discrete plays, such as a pitch, batted ball, and stolen base, and the participants in those plays are the pitcher, hitter, and runner. In soccer the play is a shot, steal, change of position, and ball out of bounds. The participants are those playing offense and defense who are involved in that play and the game flow immediately prior to the play. The system receives various streams of data that can be marked by both play and participant. Thus, the plays are to some extent and in some embodiments up to the users' discretion of what constitutes a play. This is more flexible in sports like soccer, lacrosse, and hockey, and less flexible with sports like football and baseball.

The system can receive data from many different types of sources (media types), including user generated data, video from camera sources, audio from camera sources or other recording sources, and telemetric and physiological data from personal and other tracking devices.

The system synchronizes all these various data streams and packetizes the data into a time-synchronized data set for each event. In one embodiment, the play is determined by the timestamp of when the user enters play-specific data. In other embodiments computer vision is used to analyze a video stream and recognize the timestamp for when plays occur. In some embodiments, the system associates all of the synchronized data by the participant involved in the event.

In one embodiment, the system creates one or more possible playlists, and makes the playlists available based on criteria such as participant involved, play result, or any combination of data collected for the plays. These playlists are, in one embodiment, lists of the plays that are associated with the collected date, such as text, video as a video file, and audio as accompanying audio. In some embodiments, the data points are encoded into the video as overlays so that the person accessing the information can watch the playlist as an audio/visual presentation of a sequence of the plays in the playlist. When there are multiple video assets for a specific play, those different video assets can be played one after another, or can be encoded into a single video that runs the different videos in a split screen manner.

In various embodiments, and without limitation, the playlists include a wide variety of different data associations from the event, or across multiple events, such as all hits by a given player, all swings and misses on a specific pitch type from a given pitcher, all pitches with a velocity greater than ninety miles per hour and thrown by a left-handed pitcher, all homeruns hit on a specific baseball field, and all homeruns hit on Saturday.

SPECIFIC EMBODIMENT

With reference now to the figures, there is depicted various examples of data entry and display screens that can be employed by the software system described herein. With reference to FIG. 1, there is depicted a screen shot of pitch placement screen 10 for a program according to an embodiment of the present invention. The pitch placement screen 10 includes selectable information indications for the pitch, such as in a baseball or softball game, and is a part of the charting module for a software program according to the present invention.

As can be seen in the pitch placement screen 10, there are selectable buttons for indicating either a right-handed batter or a left-handed batter, and the X and Y position of the pitch as it crosses the home plate. Graphical indications of the batter, the batter boxes, the home plate, and the field can also be depicted in the pitch placement screen 10. The user who is charting the event uses the pitch placement screen 10 to chart each pitch that is thrown in the game. In some embodiments, the program records the time at which each pitch is charted, so that this time information can be used to associate video with the pitch, as described in more detail hereafter.

Figure 2:
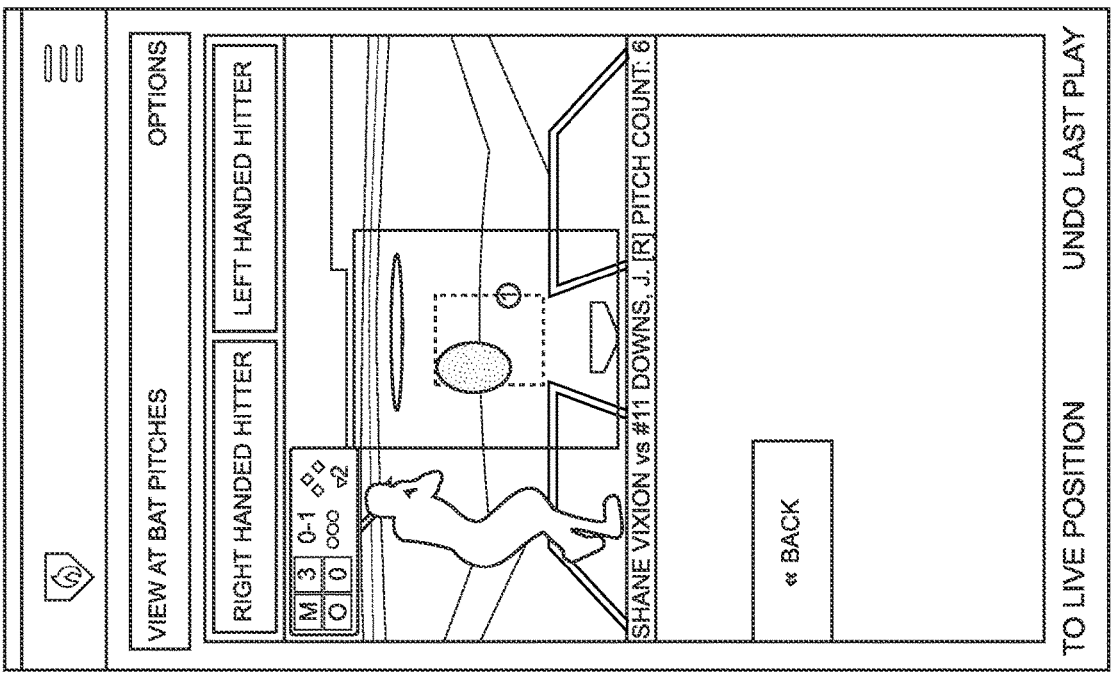
FIG. 2 is a screen shot of a pitch type and velocity screen for a program according to an embodiment of the present invention.

With reference now to FIG. 2, there is depicted a pitch type and velocity screen 20 for a program according to an embodiment of the present invention. In the embodiment depicted, the screen 20 includes selectable information indications for the type of pitch, such as a fastball, breaking ball, change up, or other type of pitch. Also available on the screen 20 in some embodiments is a place to indicate the speed of the pitch, which in some embodiments can be read by the user off of an instrument such as a nearby radar gun. In other embodiments the radar gun is connected in some manner to the computing device being used by the user to chart the event (either wired or wirelessly), and the speed of the pitch is automatically entered into the program when the user accesses the screen 20, or when the user presses a button for the speed of the pitch to be read in from the radar gun. The information in this screen 20 is used as a part of the charting record for the event, as was the information from screen 10, and as is the information from subsequent screen described below.

Figures 3, 4:
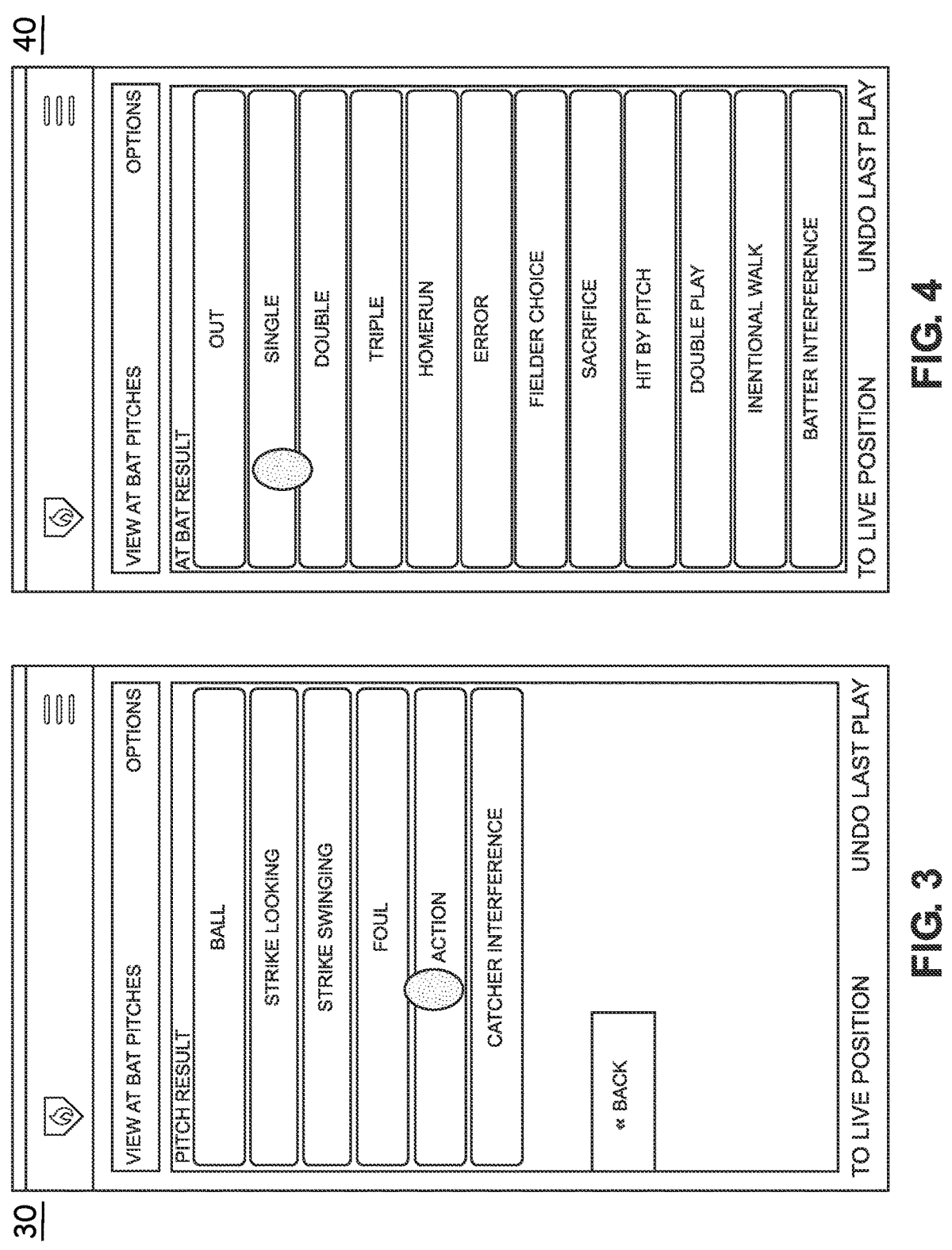

With reference now to FIG. 3, there is depicted a screen shot of a pitch result screen 30 for a program according to an embodiment of the present invention. In the embodiment depicted, the screen 30 includes selectable information indications for the result of the pitch, such as a ball, a strike that the batter did not swing at, a strike where the batter swung, a foul ball, an action event where the ball is hit and put into play, and catcher interference with the ball.

With reference now to FIG. 4, there is depicted a screen shot of an at-bat result screen 40 for a program according to an embodiment of the present invention. In the embodiment depicted, the screen 30 includes selectable information indications for the result of the player's at-bat, such as an out, single, double, triple, or homerun, and error, fielder's choice, sacrifice, hit by the pitch, double play, intentional walk, or batter interference. It is appreciated that in some embodiments of this screen 40 and the other screens described herein, there is also provision for the user to upload custom input to the program.

Figure 5:
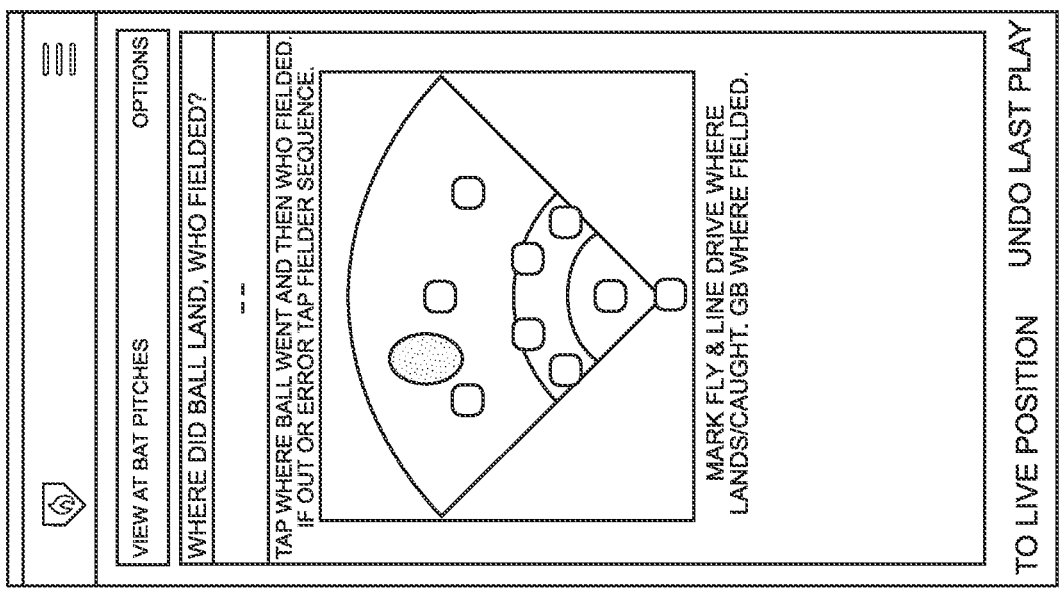
FIG. 5 is a screen shot of a ball flight screen for a program according to an embodiment of the present invention.

With reference now to FIG. 5, there is depicted a screen shot of a ball flight screen 50 for a program according to an embodiment of the present invention. In the embodiment depicted, the screen 50 includes selectable information indications for the flight of the hit ball, such as a ground ball, line drive, popup, fly ball, or bunt.

Figure 6:
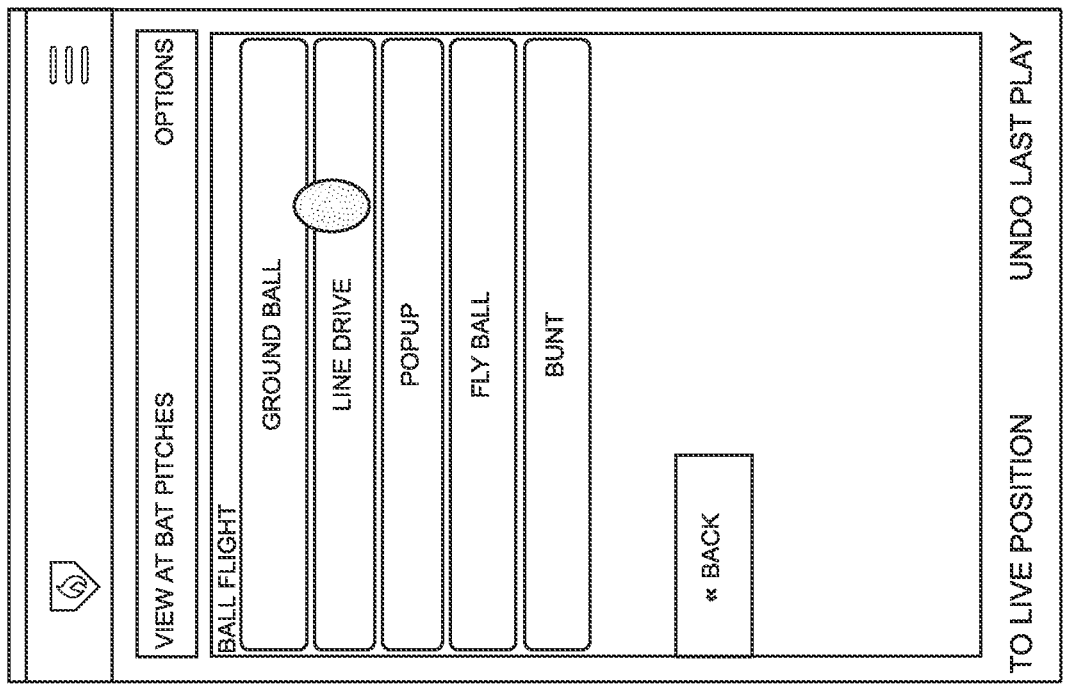
FIG. 6 is a screen shot of a hit placement and fielding screen for a program according to an embodiment of the present invention.

With reference now to FIG. 6, there is depicted a hit placement and fielding screen 60 for a program according to an embodiment of the present invention. In the embodiment depicted, the screen 60 includes selectable information indications for the user to indicate where on the field the ball landed and which player on defense fielded the ball.

Figure 7:
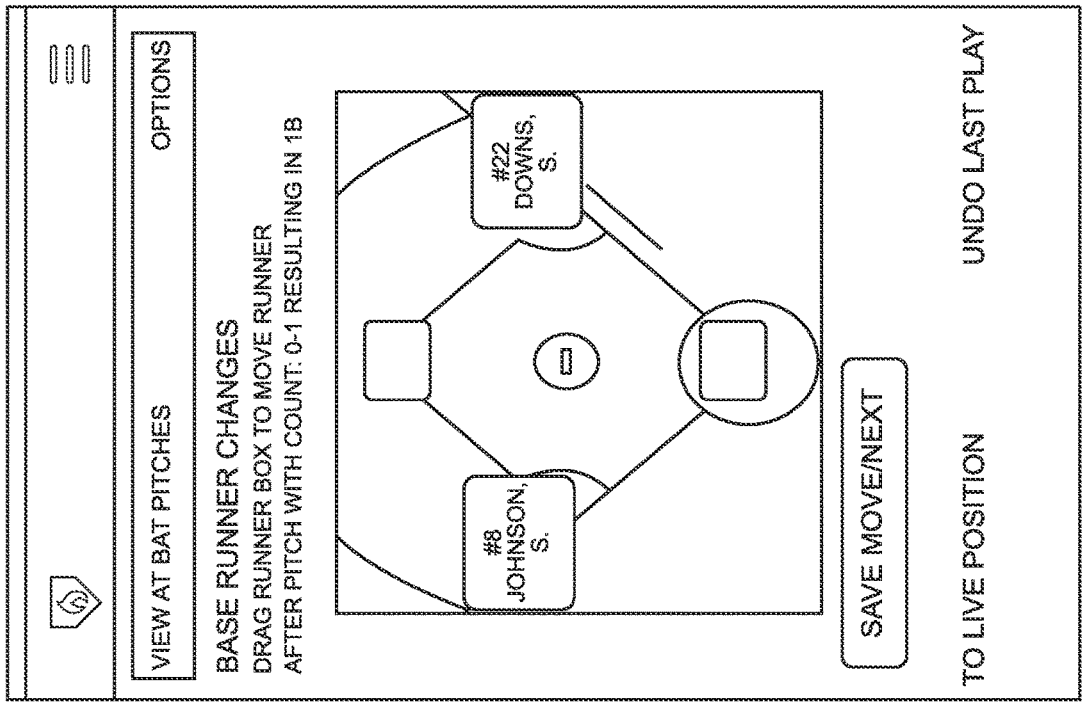
FIG. 7 is a screen shot of a base runner changes screen for a program according to an embodiment of the present invention.

With reference now to FIG. 7, there is depicted of a base runner changes screen 70 for a program according to an embodiment of the present invention. In the embodiment depicted, the screen 70 includes selectable information indications for indicating whether any of the players on base changed bases. In some embodiments this can be accomplished by dragging tokens for each base-runner to a new base. Base-runner information on this screen 70 is recorded and carried-over from previous information input screens during the charting of the event. Information such as run scoring can be automatically tallied by the program as the user indicates player base advancement to home plate on this screen 70.

Thus, FIGS. 1-7 provide examples of one embodiment of the charting module for an event. It is appreciated that different sporting events and different non-sporting events would have different sets of charting screens from what has been depicted here, which charting screens would be adapted for the particular event to be charted.

Regardless of the specific embodiment of the charting screens, the information in regard to the event is input and uploaded by the program to a server, which not only contains a log of the actions and results that transpired during the event, but also contains a synchronized log of the times at which each of those actions and results occurred.

Figure 8:
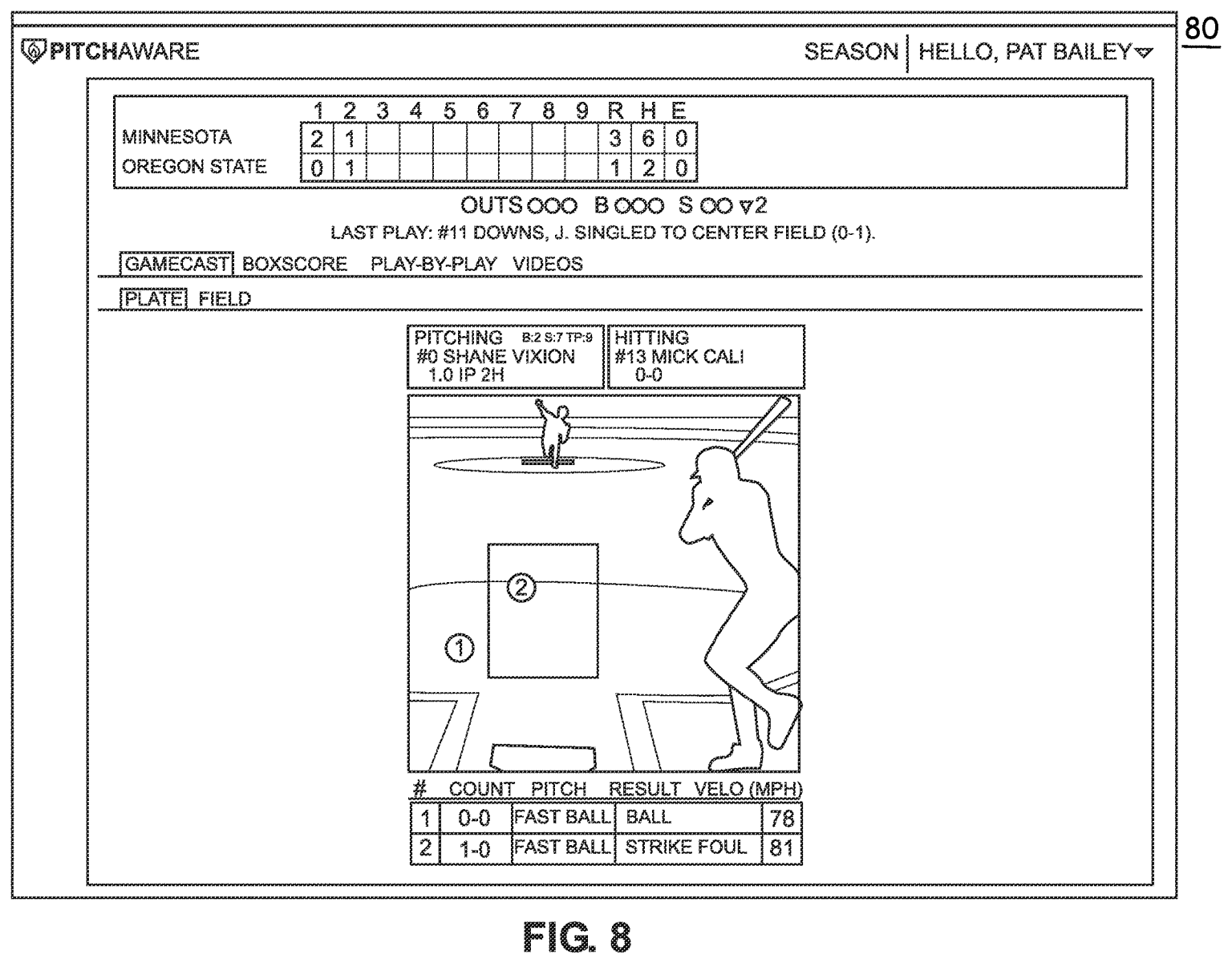

With reference now to FIG. 8, there is depicted a screen shot 80 of a charted event for a program according to an embodiment of the present invention. This charted event screen 80 displays to an observer the on-going results of the user's charting of the event. Thus, the observer can log into the program that is running on the server, and by entering proper event identification and credentials, can view either after-the-fact or in real-time the progress of the event. In the embodiment as depicted, the observer can see information in regard to the teams that are playing, the current score, the progress of the game, information about the pitcher and the batter, and information in regard to the latest pitch. Some embodiments also include graphical representations in regard to the latest pitch.

In some embodiments of the program, the screen 80 includes a link to view a video clip of the pitch, which video clip is produced as described herein. Further, in some embodiments of the program, the screen 80—either in addition to or instead of the graphical representation of the pitch—provide an actual video clip display of the pitch, with the graphical information overlaid, such as the pitch placement information.

With reference now to FIG. 9, there is depicted a table of some simple rules for clipping a video according to an embodiment of the present invention. Producing these rules is the starting point for determining what portions of the various video files that have been streamed or uploaded to the server should be selected for the highlight videos described herein.

In the embodiment depicted in FIG. 9, the rules include a list of trigger events that, if all conditions are met, results in the production of a video clip for use either in the screen 90 described above, or in the further production of a highlight video, or otherwise as generally indicated herein.

In the example depicted in FIG. 9, the rules comprise two different triggers. The first trigger is a check of whether at least one run has been scored. In this rule, a single trigger is used to clip the video whenever a run is scored. This rule would be useful to produce video clips of whenever a run is scored, as those tend to be the events that are of interest to an observer of the event.

The second trigger is a compound rule. This second trigger is only satisfied when all three of the listed conditions are met, which in this example are, first—there are exactly two outs, second—there are runners on both second base and third base, and third—the at-bat result is a strike-out. This rule is useful to produce a video clip whenever a batter strikes out leaving potential runs on second and third.

It is appreciated that in actual implementation, a larger number of different rules would typically be implemented, so as to produce a greater number of highlight video clips. For example, in some embodiments, every pitch might produce a video clip, so that the observers using screen 90 can watch more of the event. In some embodiments, only the left-hand batters produce video clips, so that a coach can observe the performance of the pitcher against left-hand batters, for example. Various other kinds of rules are also contemplated herein.

In some embodiments, anyone with the ability to access the system can produce their own list of triggers and then designate the data set that the system looks at to find plays that satisfy the triggers, thus producing a personalized playlist of those actions that the individual user is interested in. For example, the data set could include all events, or only those events in which a specific participant was involved, or a specific type of event. The triggers that produce the playlist could include any number or combination of charted actions as described herein. Any of the other combinations of data sets and triggers as described elsewhere herein are also contemplated.

In some embodiments, the system employs computer vision algorithms to inspect the uploaded videos and, based on prior learning or input, can detect for itself without charting input various actions on which a user can specify as triggers to produce the playlist, and the highlight video.

It is also contemplated that different rule sets can be used to produce different sets of video clips to be assembled into different highlight videos for the same event. For example, different consumers of the highlight videos might be interested in different aspects of the event. A batting coach might want to see a highlight video of all the batting clips. A fielding coach might want to see a highlight video of all the fielding. A scout might want to see everything that was done by a specific player, and so forth. Flagging the video clips according to which rule set produced the video clip can be performed, and then commonly-flagged video clips are compiled into a highlight video. These viewer-specific highlight videos can receive different introduction sequences that further identify the emphasis of the highlight video.

With reference now to FIG. 10 there is depicted a table 100 of charted information from an event according to an embodiment of the present invention. This information comes from the charting actions input by the user as described above, and as recorded by the program. The embodiment as depicted in FIG. 10 includes at least some of the following information, with a time stamp so that the program knows the time at which the listed event occurred. Each record includes the pitch count, including balls and strikes. The pitch location, type, and result are also listed. Thereafter, the at-bat result is listed, the base-runner locations, and the number of runs scored on the pitch. Other information that is included in some embodiments is the names of the batter and base-runners. In some embodiments, all of the charting information is listed in the table.

The highlighted records in the table 100 indicate those events which meet the conditions of at least one of the two triggers listed in FIG. 9. The first record flagged is for an at-bat that resulted in a run, so that met the condition of the first trigger. The second record flagged is for a strike-out that left runners on second and third, which met the conditions of the second trigger. The time-codes in each of these two records are used to select clips from video files, as described below.

With reference now to FIG. 11, there is depicted a representation of video clips 113 and 114 that are selected from a larger video file 112, based upon the generated events of FIG. 10 and the rules of FIG. 9, according to an embodiment of the present invention. The video file 112 could be one or more of the various videos that were uploaded to the server and associated with the event by the user and others who were video recording the event. Thus, for each time-code from a trigger event, a first clip can be selected from a first video file, a second clip can be selected from a second video file, and so forth for all of the video source files that are uploaded to the server in association with the event.

In some embodiments, the length of these clips can be set by a default that is input by the user, such as ten seconds, of which time a couple seconds can be taken before the time code so as to provide context for the triggered event, and the balance of the length of the clip can be taken after the time code, in some user-selectable manner, or as set by the program.

Figure 12:
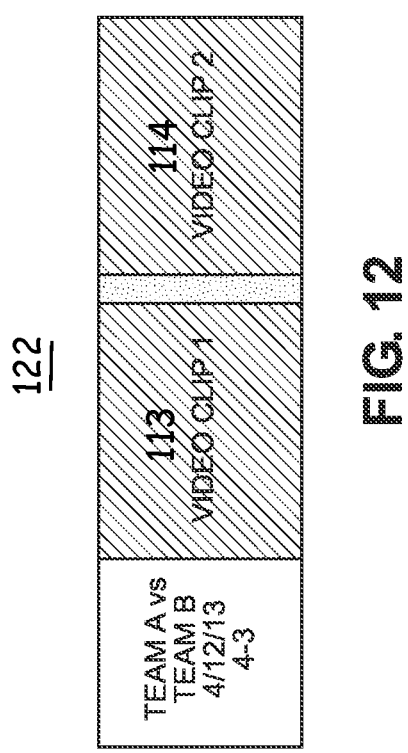
FIG. 12 is a representation of a highlight video created from the video clips taken as depicted in FIG. 11 according to an embodiment of the present invention.

With reference now to FIG. 12 there is depicted a representation of a highlight video 122 created from the video clips 113 and 114 taken as depicted in FIG. 11 according to an embodiment of the present invention. The highlight video 122 is produced, in this embodiment, by putting the two video clips 113 and 114 together into a single video file in chronological order. In some embodiments, a transition of some sort is placed between the video clips. It is appreciated that any number of video clips can be used to produce the highlight video 122. Also in this embodiment there is placed at the onset of the highlight video an introduction to the highlight video, such as an introduction to and identification of the event and the event participants, such as teams, dates, and times.

Figure 13:
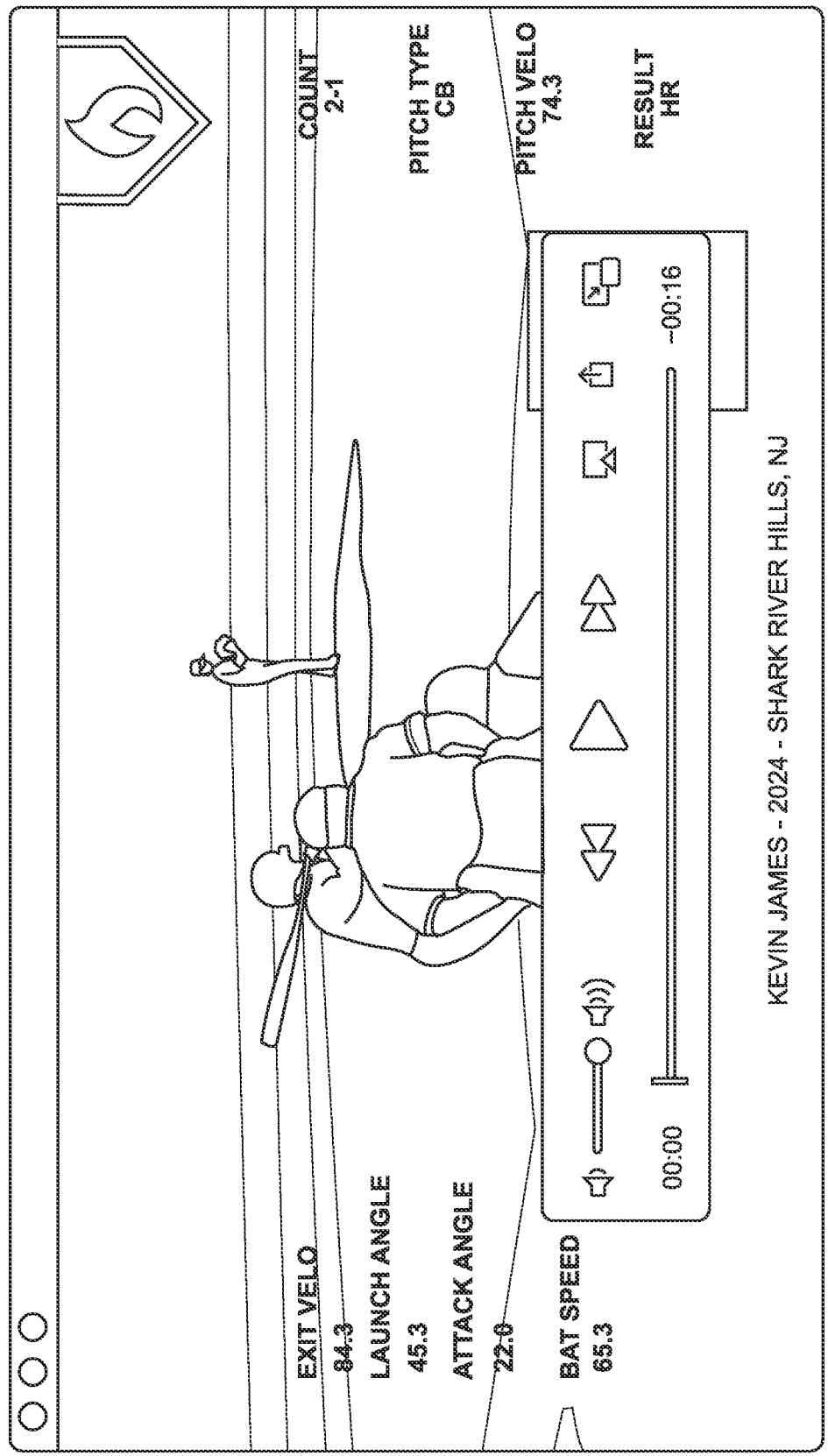
FIG. 13 is a screen shot of a highlight video according to an embodiment of the present invention.

With reference now to FIG. 13, there is depicted a screen shot of a highlight video 122 according to an embodiment of the present invention. In this particular embodiment, the highlight video 122 includes some of the information as recorded during the charting process as graphical overlays on the video presentation, which tends to provide additional context as to the particular clipped event for the observer.

Figure 14:
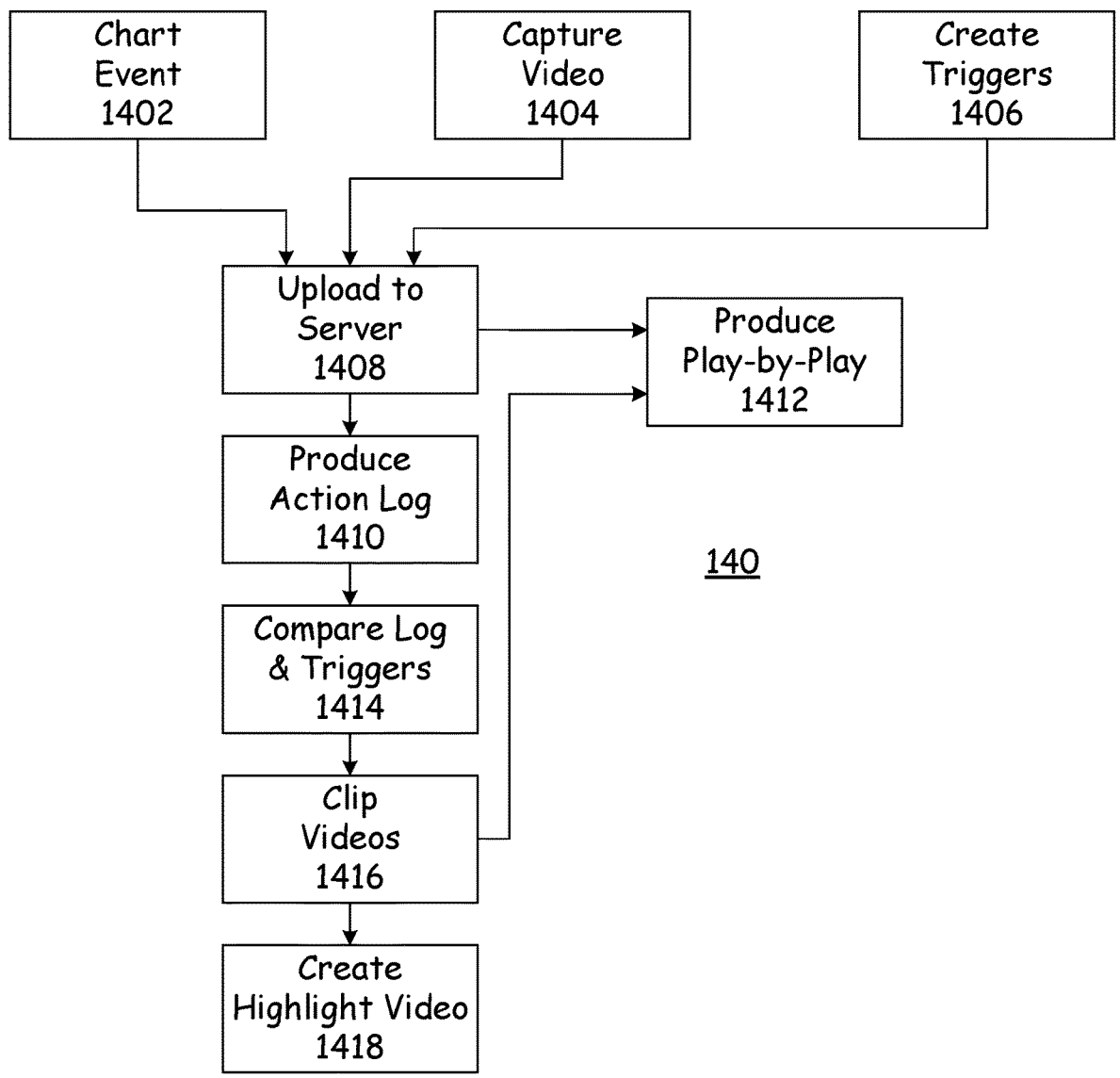
FIG. 14 is a flow chart of a method for creating a highlight video according to an embodiment of the present invention.

With reference now to FIG. 14, there is depicted a flow chart of a method for producing a highlight video according to an embodiment of the present invention. The event is charted, as given in block 1402, according to the embodiments as described herein. Video is captured of the event, as given in block 1404, either from one camera or many cameras. Triggers are created for the event, or are selected from a library of triggers according to the event type, as given in block 1406.

Some of these actions can be performed simultaneously, such as the charting of the event as given in block 1402 and the video capture of the event as given in block 1404. The creation of the triggers as given in block 1406 could be performed at a different time as the charting and video capture. In some embodiments, the video is captured as in block 1404, and then the event is charted as given in block 1402 by watching the video 1404. Other embodiments are also contemplated herein.

The various data streams created in blocks 1402, 1404, and 1406 are uploaded to the server, as given in block 1408. The server can produce and output an event play-by-play page for the benefit of observers of the event, as given in block 1412 and as described above. The server also produces a log of the various actions that are charted in the event, as given in block 1410. This log of actions is compared to the triggers as given in block 1414. The time codes for those actions that meet the criteria of the various triggers are use to create video clips from desired ones of the one or more uploaded video files, as given in block 1416. In one embodiment, these video clips can be integrated by the server into the event play-by-play presentation in block 1412. In another embodiment, these video clips can be integrated into a highlight video of the event, as given in block 1418.

Figure 15:
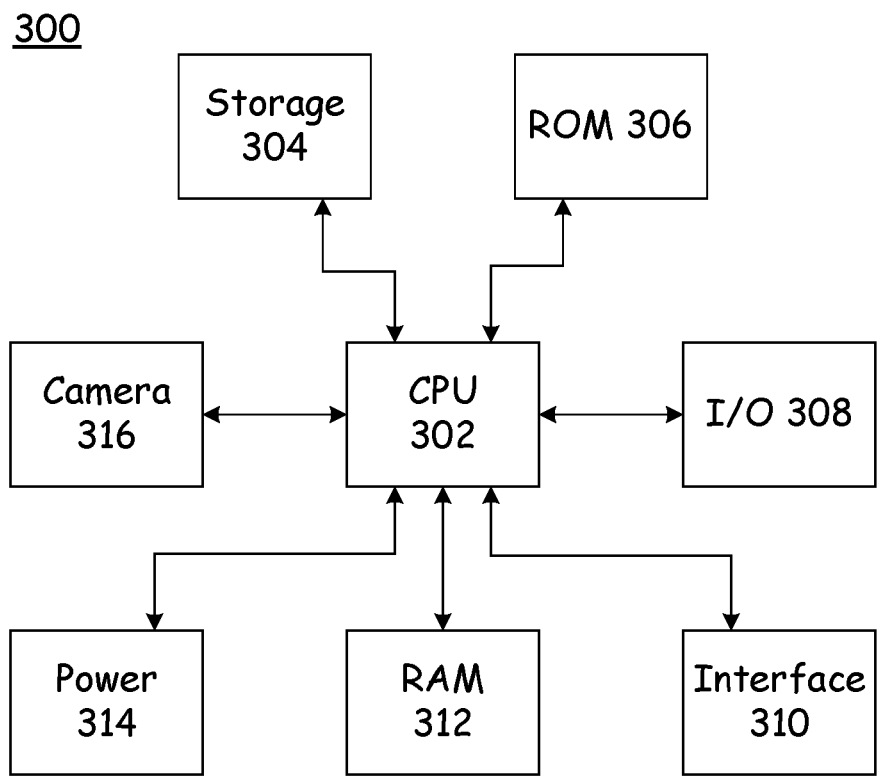
FIG. 15 is a function block diagram of an apparatus for producing a highlight video according to an embodiment of the present invention.

With reference now to FIG. 15, there is depicted one embodiment of a computerized apparatus 300 capable of performing the actions as described herein. In this embodiment, the apparatus 300 is under the control of the central processing unit 302, which controls and utilizes the other modules of the apparatus 300 as described herein. As used herein, the word module refers to a combination of both software and hardware that performs one or more designated function. Thus, in different embodiments, various modules might share elements of the hardware as described herein, and in some embodiments might also share portions of the software that interact with the hardware.

The embodiment of apparatus 300 as depicted in FIG. 15 includes, for example, a storage module 304 such as a hard drive, tape drive, optical drive, or some other relatively long-term data storage device. A read-only memory module 306 contains, for example, basic operating instructions for the operation of the apparatus 300. An input-output module 308 provides a gateway for the communication of data and instructions between the apparatus 300 and other computing devices, networks, or data storage modules. An interface module 310 includes, for example, keyboards, speakers, microphones, cameras, displays, mice, and touchpads, and provides means by which the engineer can observe and control the operation of the apparatus 300.

A random-access memory module 312 provides short-term storage for data that is being buffered, analyzed, or manipulated and programming instructions for the operation of the apparatus 300. A power module 314 is also provided in various embodiments of the apparatus 300. In some embodiment that power module 314 is a portable power supply, such as one or more batteries. In some embodiments the power module 314 includes a renewable source, such as a solar panel or an inductive coil that are configured to provide power or recharge the batteries. In other embodiments the power module 314 receives power from an external power source, such as a 110/220 volt supply.

Some embodiments of the apparatus 300 include one or more cameras 316, which provide video files to the apparatus 300.

In one embodiment, the apparatus 300 receives input from the user through the input/output 308. In other embodiments, the apparatus 300 receives uploaded video from the camera 316. In either embodiment, the apparatus 300 performs the functions as described herein, and then sends the data out through the input/output 308 for remote storage or further processing, or directly to the storage module 304. In some embodiments the steps of the method as described herein are embodied in a computer language on a non-transitory medium that is readable by the apparatus 300 of FIG. 15, and that enables the apparatus 300 to implement the process as described herein.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A computerized apparatus for creating a highlight video, the apparatus comprising:
an interface for charting an event by manually recording information in regard to the event, where the event information is associated with time codes,
a camera for capturing video of the event, where the video is associated with the time codes,
the interface further for receiving triggers from a user, the triggers comprising lists of at least one trigger action that might occur during the event but cannot be known in advance of the event,
an input/output for uploading the event information, video, and triggers to a server,
a processor for producing entries in an action log from the event information, the entries comprising historical actions that occurred during the event,
the processor further for automatically and without human intervention comparing the historical actions in the entries in the action log to the trigger actions in the triggers to determine if any of the historical actions in the entries in the action log match any of the trigger actions in the triggers, and collecting the time codes of those historical actions in the entries that match the trigger actions in the triggers,
the processor further for automatically and without human intervention creating video clips from the video of the event, based on the collected time codes, and
the processor further for automatically and without human intervention compiling the video clips into the highlight video.

2. The apparatus of claim 1, the processor further for creating and posting a play-by-play page that provides a selection of the event information on a web page.

3. The apparatus of claim 2, wherein the play-by-play page includes a given one of the video clips as soon as it is created.

4. The apparatus of claim 2, wherein the play-by-play page includes the highlight video.

5. The apparatus of claim 1, wherein the highlight video includes an introduction to the event at a beginning of the highlight video.

6. The apparatus of claim 1, wherein the highlight video includes transitions between each of the video clips compiled into the highlight video.

7. A computerized method for creating a highlight video, the method comprising the steps of:
charting an event by manually recording information in regard to the event, where the event information is associated with time codes,
capturing video of the event, where the video is associated with the time codes,
receiving triggers from a user, the triggers comprising lists of at least one trigger action that might occur during the event but cannot be known in advance of the event,
uploading the event information, video, and triggers to a server,
producing entries in an action log from the event information, the entries comprising historical actions that occurred during the event,
automatically and without human intervention comparing the historical actions in the entries in the action log to the trigger actions in the triggers to determine if any of the historical actions in the entries in the action log match any of the trigger actions in the triggers, and collecting the time codes of those historical actions in the entries that match the trigger actions in the triggers, automatically and without human intervention creating video clips from the video of the event, based on the collected time codes, and automatically and without human intervention compiling the video clips into the highlight video.

8. The method of claim 7, further comprising creating and posting a play-by-play page that provides a selection of the event information on a web page.

9. The method of claim 8, wherein the play-by-play page includes a given one of the video clips as soon as it is created.

10. The method of claim 8, wherein the play-by-play page includes the highlight video.

11. The method of claim 7, wherein the highlight video includes an introduction to the event at a beginning of the highlight video.

12. The method of claim 7, wherein the highlight video includes transitions between each of the video clips compiled into the highlight video.

13. The method of claim 7, wherein the step of charting the event is performed by watching the video of the event.

14. A non-transitory, computer-readable storage medium having stored thereon a computer program comprising a set of instructions for causing a computer to create a highlight video by performing the steps of:

charting an event by manually recording information in regard to the event, where the event information is associated with time codes, capturing video of the event, where the video is associated with the time codes, receiving triggers from a user, the triggers comprising lists of at least one trigger action that might occur during the event but cannot be known in advance of the event, uploading the event information, video, and triggers to a server, producing entries in an action log from the event information, the entries comprising historical actions that occurred during the event, automatically and without human intervention comparing the historical actions in the entries in the action log to the trigger actions in the triggers to determine if any of the historical actions in the entries in the action log match any of the trigger actions in the triggers, and collecting the time codes of those historical actions in the entries that match the trigger actions in the triggers, automatically and without human intervention creating video clips from the video of the event, based on the collected time codes, and automatically and without human intervention compiling the video clips into the highlight video.

15. The storage medium of claim 14, wherein the steps further comprise creating and posting a play-by-play page that provides a selection of the event information on a web page.

16. The storage medium of claim 15, wherein the play-by-play page includes a given one of the video clips as soon as it is created.

17. The storage medium of claim 15, wherein the play-by-play page includes the highlight video.

18. The storage medium of claim 14, wherein the highlight video includes an introduction to the event at a beginning of the highlight video.

19. The storage medium of claim 14, wherein the highlight video includes transitions between each of the video clips compiled into the highlight video.

20. The storage medium of claim 14, wherein the step of charting the event is performed by watching the video of the event.

* * * * *